(12) United States Patent
Sakamoto

(10) Patent No.: US 7,446,961 B2
(45) Date of Patent: Nov. 4, 2008

(54) LENS DEVICE

(75) Inventor: Kenichi Sakamoto, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 11/850,514

(22) Filed: Sep. 5, 2007

(65) Prior Publication Data

US 2008/0055754 A1    Mar. 6, 2008

(30) Foreign Application Priority Data

Sep. 5, 2006    (JP)    ............................. 2006-240130

(51) Int. Cl.
G02B 7/02    (2006.01)
(52) U.S. Cl. ...................... 359/819; 359/811; 359/820; 451/460
(58) Field of Classification Search ................ 359/811, 359/819, 820, 814, 830; 369/44.23, 112.23, 369/112.24, 72, 79, 83, 85; 348/340, 345, 348/374; 351/43, 460
See application file for complete search history.

(56) References Cited

U.S. PATENT DOCUMENTS

| 3,512,310 | A | * | 5/1970 | Rudd et al. ................. 451/460 |
| 4,723,833 | A | * | 2/1988 | Yamada ....................... 359/820 |
| 4,725,126 | A | * | 2/1988 | Siga et al. .................... 359/819 |
| 5,073,324 | A | * | 12/1991 | Beaudet ....................... 264/255 |
| 5,176,441 | A | * | 1/1993 | Horvath dr.nee Vegh et al. .......................... 362/267 |
| 5,938,876 | A | * | 8/1999 | Edwards et al. ................ 156/99 |
| 6,354,747 | B1 | * | 3/2002 | Irie et al. ....................... 385/88 |
| 6,695,775 | B2 | * | 2/2004 | Watanabe et al. ........... 600/176 |
| 6,900,953 | B2 | * | 5/2005 | Okumura ..................... 359/819 |
| 7,289,282 | B2 | * | 10/2007 | Matsushima ................. 359/819 |
| 2007/0121222 | A1 | * | 5/2007 | Watanabe ................... 359/811 |
| 2007/0121223 | A1 | * | 5/2007 | Watanabe ................... 359/811 |

FOREIGN PATENT DOCUMENTS

JP    11211957    8/1999

* cited by examiner

*Primary Examiner*—Loha Ben
(74) *Attorney, Agent, or Firm*—Young & Thompson

(57) ABSTRACT

A lens element has an annular flange portion which has a tapered lateral surface so as to form at least an annular clearance tapering from a rear edge thereof when it is received in a lens holder. An adhesive which is partly filled in the clearance curs in wedge-shape to secure the lens element to the lens holder, and besides forming wedges by which the lens element is forced and held in an axial direction so as thereby to prevent the lens element from falling out of the lens holder even if the adhesive exfoliates from either one or both of the lens element and the lens holder.

6 Claims, 7 Drawing Sheets

US 7,446,961 B2

LENS DEVICE

BACKGROUND OF THE INVENTION

1. Field of the Invention

The present invention relates to a lens device having a structure for preventing a lens element from being detached from a lens holding flame.

2. Description of Related Art

Lens devices such as a wide angle lens and a telephoto lens are used for various optical instruments including cameras. Such a lens device comprises a lens barrel and a lens system having a plurality of lens elements which are held in the lens barrel by various lens holding mechanisms. A typical lens holding mechanism includes a cylindrical or annular lens holding fixture frame in which a lens element is bonded by an adhesive and fixedly held. The lens holding fixture frame is moved in an axial direction in the lens barrel for zooming or focusing by means of a cam mechanism. When fixing the lens element into the lens holding fixture frame, it is usual to use jigs and fixtures for position adjustment of the lens element with respect to the lens holding fixture frame. In order to allow the lens element to be adjusted in position, there is provided an annular clearance between the lens element and the lens holding fixture frame. After position adjustment, an adhesive is filled in the annular clearance to fix the lens element to the lens holding fixture frame.

Before describing the present invention in detail, reference is made to FIGS. 6 and 7 for the purpose of providing a brief background that will enhance an understanding of the feature of the present invention. FIG. 6 shows a prior art lens device 1' having a lens holding structure for holding a plastic lens element in a diametrical cross section. As shown, the lens device 1' has an annular lens holding fixture frame 2', a plastic lens element 3' fixedly held in the lens holding fixture frame 2' and a lens barrel 4 in which the lens holding fixture frame 2' is movably received. The lens holding fixture frame 2' is moved along an axis L of a lens system including the lens element 3' in the lens barrel 4 by means of a cam mechanism which is not shown and, however, known in various forms in the art. The lens holding fixture frame 2' is provided with a rear frame portion 11'. This rear frame portion 11', which is formed as an integral part of the lens holding fixture frame 2', has a plurality of holes 9' circumferentially arranged at regular angular intervals which are used to adjust the lens element 3' in position. After completion of the adjustment, an adhesive is applied into an annular clearance between the lens element 3' and the lens holding fixture frame 2' through some of the holes 9' so as to fix the lens element 3' to the lens holding fixture frame 2'. The lens holding fixture frame 2' is further provided with an inner annular flange 10' serving as a positioning wall against which a flange portion 8' of the lens element 3' is pressed so as thereby to be axially positioned. On the other hand, the lens element 3' has a lateral surface 7' tapering from a front edge thereof so that an annular clearance is formed between the lens element 3' and the lens holding fixture frame 2'. An adhesive 12, which is filled partly in the annular clearance through some of the holes 9', cures to fix the lens element 3' in the rear frame portion 11' of the lens holding fixture frame 2'.

The lens element 3' is injection molded by the use of a mold 13' such as shown in FIG. 7. The mold 13' comprises an upper mold half 13U and a lower mold half 13L between which a mold cavity 14' is formed. The lower mold half 13L has a flank 14a' forming a peripheral wall of the mold cavity 14' which has a predetermined draft angle and is provided with a plurality of ejection pins 15' arranged correspondingly to an annular shoulder 14b' for forming a front base surface of the flange portion 8' of the lens element 3'. The lateral surface 7' of the lens element 3' tapers backwards at an angle which is derived from the draft angle of the flank 14a' of the mold cavity 14'.

A problem encountered by the lens device 1' is that the lens element 3' causes displacement with respect to or falls out of the lens holding fixture frame 2' due to adhesive transfer which arises from thermal expansion of the lens holding fixture frame 2' or an external impact on the lens holding fixture frame 2'. If the lens element 3' causes displacement in the lens holding fixture frame 2', the lens device 1' looses its given optical characteristics or ceases to function properly and, as a consequence, disables the optical instrument itself for use. One of means for eliminating the problem which is disclosed in, for example, Japanese Unexamined Patent Publication No. 11-211957 is to form a plurality of V-shaped grooves in an interface between a lens element and a lens holding fixture frame. An adhesive feeds into the grooves and is cured therein so as thereby to wedge up the lens element in the lens holding fixture frame.

However, it counts against requirements for a simple shape of the lens holding fixture frame and a high injection molding yield of lens element to form the V-shaped grooves in the lens holding fixture frame.

SUMMARY OF THE INVENTION

It is therefore an object of the present invention to provide a lens device which has a structure for preventing a lens element from falling out of a lens holding fixture frame and can reduce the cost of production.

The foregoing object of the present invention is accomplished by a lens device comprising a lens element, a lens holder for holding the lens element therein and fixing means for fixing the lens element to the lens holder According to an embodiment, the lens element has a major lens portion and an annular flange portion formed as an integral piece, the annular flange portion having a lateral surface tapering forward from a rear edge of the annular flange portion, and the lens holder comprises a cylindrical frame for receiving the lens element therein and an annular flange formed as an integral part of the cylindrical frame for positioning the lens element received in the cylindrical frame in an axial direction. The fixing and retaining means comprises a tapered annular clearance formed between the lateral surface of the annular flange portion of the lens element received in the cylindrical frame and the cylindrical frame and an adhesive partly filled in the tapered annular clearance, wherein the adhesive cures in a wedge-shape in the tapered annular clearance so as thereby to thrusts the lens element toward the annular flange in the axial direction.

According to another embodiment the lens element has a major lens portion and an annular flange portion formed as an integral piece, the lens holder comprises a cylindrical frame for receiving the lens element therein and an annular flange formed as an integral part of the cylindrical frame for positioning the lens element received in the cylindrical frame in an axial direction. the annular flange portion having a lateral surface tapering from front and rear edges of the annular flange portion, and the fixing and retaining means comprises tapered annular clearances formed between the lateral surface of the annular flange portion of the lens element received in the cylindrical frame and the cylindrical frame and extending from the front and rear edges of the annular flange portion, and an adhesive partly filled in the tapered annular clearance, wherein the adhesive cures in a wedge-shape in the tapered annular clearances so as thereby to thrusts the lens element in opposite axial directions.

It is desired that the lens holder has a plurality of access holes formed at circumferential regular intervals in the cylindrical frame through which the adhesive is filled into the tapered annular clearances.

The lens element is preferably made of a synthetic resin and produced in injection molding by the use of a mold comprising upper and lower mold halves, each of which has a flank for defining a mold cavity of the mold and having a draft angle which forms the lateral surface tapering from either one or both of the front and rear edges.

The lens device having the wedge-shaped retaining means which performs as a retaining wedge prevents the lens element from falling out of the lens holder. In the case where the lens element is required to be adjusted in an axial position and an inclination of its optical axis with respect to the lens holder, the lens device having the wedge-shaped retaining means tapering from front and rear edges of the annular flange portion, so as to prevent the lens element from falling out of the lens holder, and besides shifting in axial position. Because the conventional injection mold can be used by only changing a position of a flank which provides a draft angle, the lens device is produced at a low cost without affecting a yield rate.

BRIEF DESCRIPTION OF THE DRAWINGS

The foregoing and other objects and features of the present invention will be clearly understood from the following detailed description when reading with reference to the accompanying drawings in which same or similar parts or portions are denoted by the same reference numerals for avoiding repetitive descriptions and wherein.

DETAILED DESCRIPTION OF THE PREFERRED EMBODIMENTS

Figure 1:
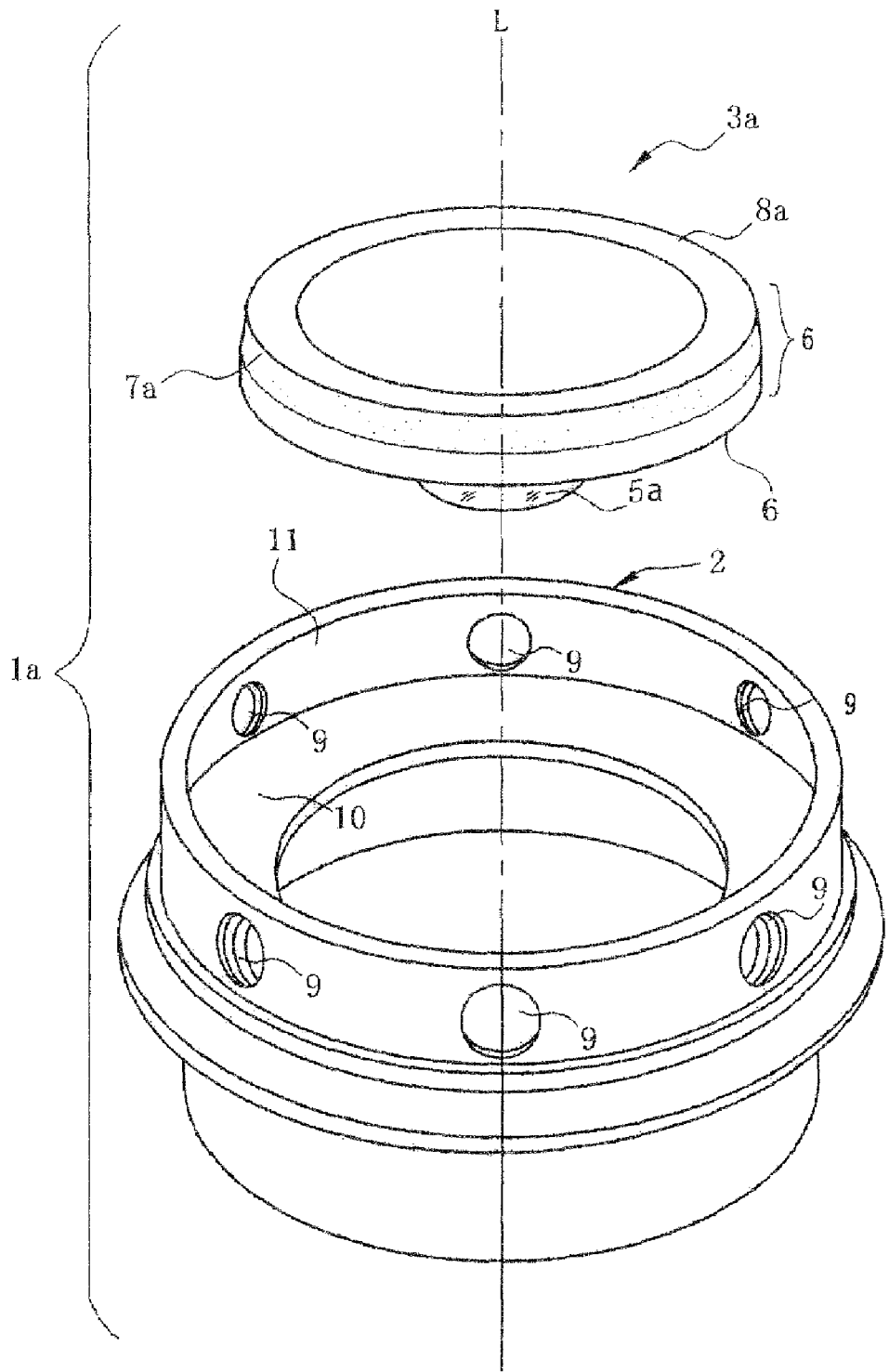
FIG. 1 is an exploded perspective view of a lens device according to an embodiment of the present invention.
Figure 2:
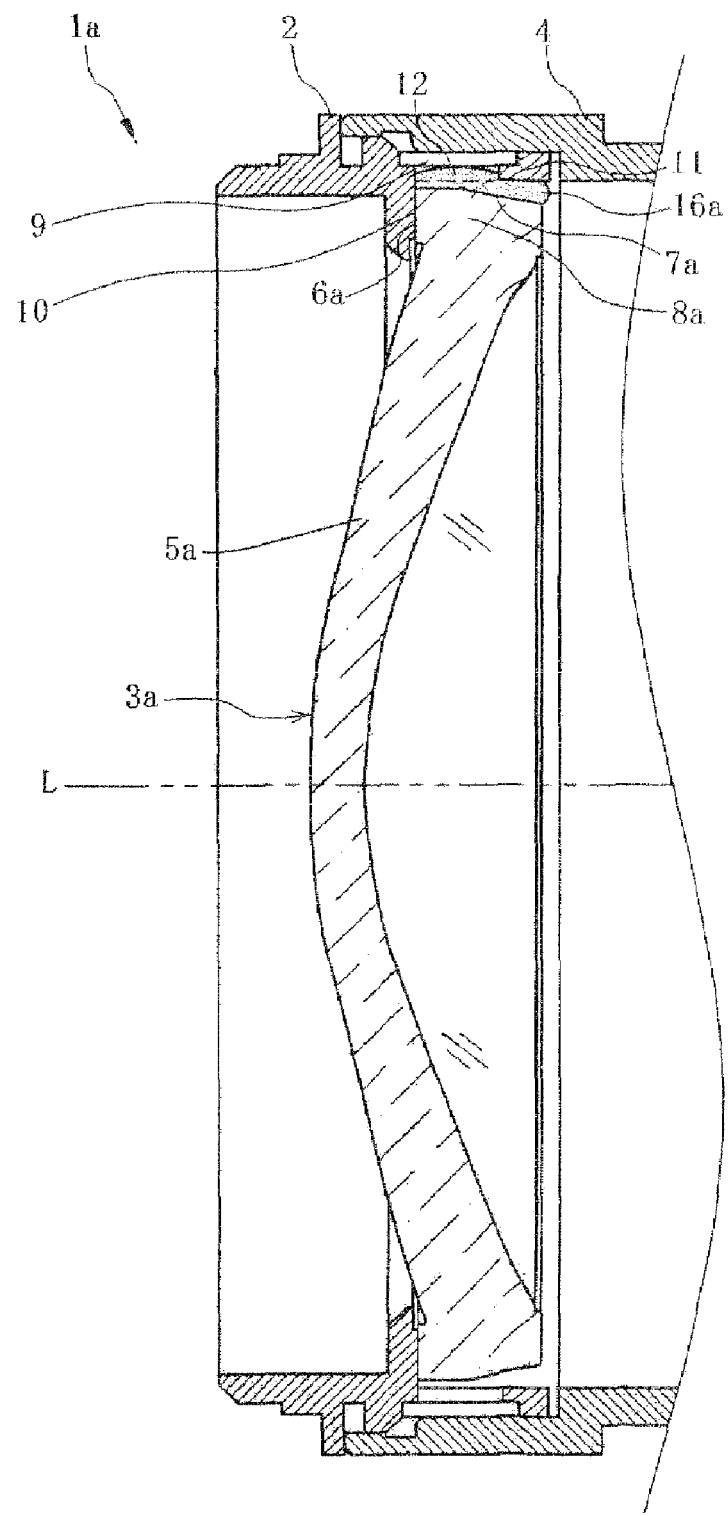
FIG. 2 is a longitudinal sectional view of the lens device.

Referring to the accompanying drawings in detail and, in particular, to FIGS. 1 and 2 showing a lens device 1a according to an embodiment, the lens device 1a comprises a plastic lens element 3a and a lens holding fixture frame 2 made of a synthetic resin which fixedly holds the plastic lens element 3a therein. The lens holding fixture frame 2 comprises a cylindrical frame body having a rear frame portion 11 and an inner annular positioning flange 10 both of which are formed as integral parts of the frame body. The lens element 3a is received within the rear frame portion 11. The annular positioning flange 10 serves as a positioning wall for supporting and positioning the lens element 3a in a direction of an axis L of the lens element 3a (which is hereinafter referred to as an axial direction L). The rear frame portion 11 has a plurality of, specifically three or more, holes 9 circumferentially arranged at regular angular intervals. The holes 9 provide access to an interface between the lens element 3a and the for adjustment of the lens element 3a in the axial direction L and serves as inlets through which an adhesive is fed to fixedly bond the lens element 3a to the rear frame portion 11.

The lens element 3a comprises a major lens portion 5a and a flange portion 8a which are formed as an integral piece. The flange portion 8a has a lateral surface 7a half tapered forward from the rear edge thereof which provides a draft angle for ejection from an injection mold 3a (see FIG. 3) and a front base surface 6. In a state in which the lens element 3a is fitted in the rear frame portion 11, while the front base surface 6 abuts against the positioning flange 10 of the lens holding fixture frame 2 for positioning in the axial direction L, the tapered lateral surface 7a forms an annular clearance tapering forward from the rear end of the lens element 3a between the flange portion 8a and the rear frame portion 11.

Figure 3:
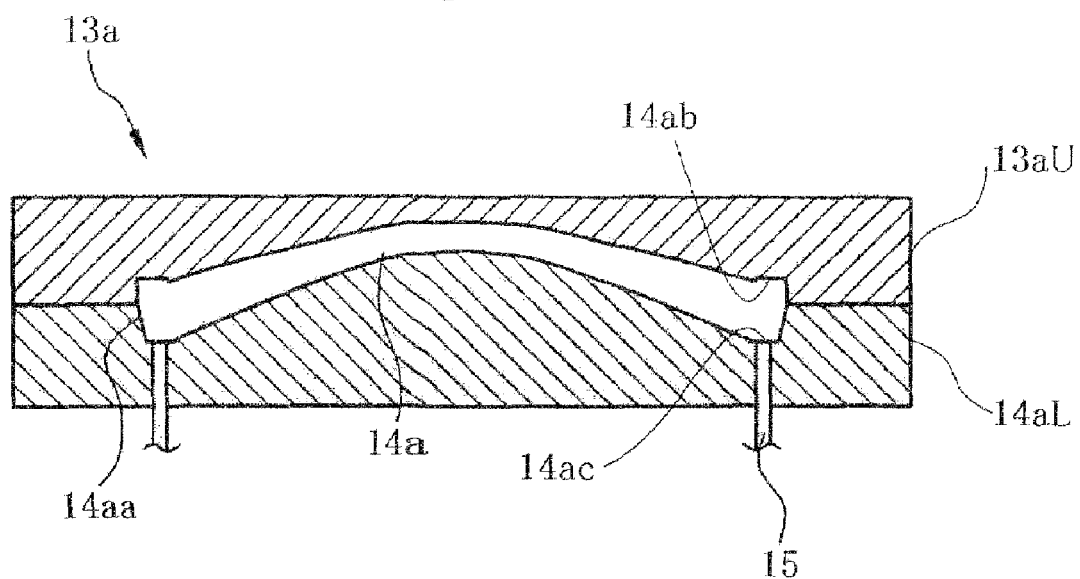
FIG. 3 is a cross sectional view of an injection mold for molding a lens element of the lens device shown in FIG. 2.

Referring to FIG. 3 showing an injection mold 13a for injection molding the lens element 3a, the injection mold 13a comprises an upper mold half 13aU and a lower mild half 13aL between which a mold cavity 14a is formed. The lower mold half 13aL forming a lower half of the mold cavity 14a has a flank 14aa forming a peripheral wall of the mold cavity 14a which forms a draft angle equal to that of the lateral surface 7a of the flange portion 8a of the lens element 3a and is provided with a plurality of ejection pins 15 arranged correspondingly to an annular shoulder 14ac. On the other hand, the upper mold half 13aU forming an upper half of the mold cavity 14a has a shoulder 14ab for forming the front base surface 6a of the flange portion 8a of the lens element 3a.

When installing the lens element 3a into the lens holding fixture frame 2, the lens element 3a is positioned in a desired position in the axial direction L by the annular positioning flange 10 and, however, slightly looses within the rear frame portion 11 in a radial direction. Specifically, there is left an annular clearance tapering forward from the rear edge of the flange portion 8a of the lens element 3a between the rear frame portion 11 and the flange portion 8a. The lens element 3a is firmly fixed in the lens holding fixture frame 2 by joining the flange portion 8a to the rear frame portion 11 with an adhesive 12, desirably such as an UV cure adhesive, which is filled partly in the annular clearance through some of the holes 9. The adhesive 12 forms wedge-shaped retaining means 16a when it cures. The wedge-shaped retaining means 16a fixedly hold the flange portion 8a of the lens element 3a in position in both the axial direction L and the radial direction in cooperation with the annular positioning flange 10. Accordingly, even if the adhesive 12 exfoliates from either or both of the rear frame portion 11 and the flange portion 8a, the wedge-shaped retaining means 16a prevent the lens element 3a from falling out of the lens holding fixture frame 2.

Figure 4:
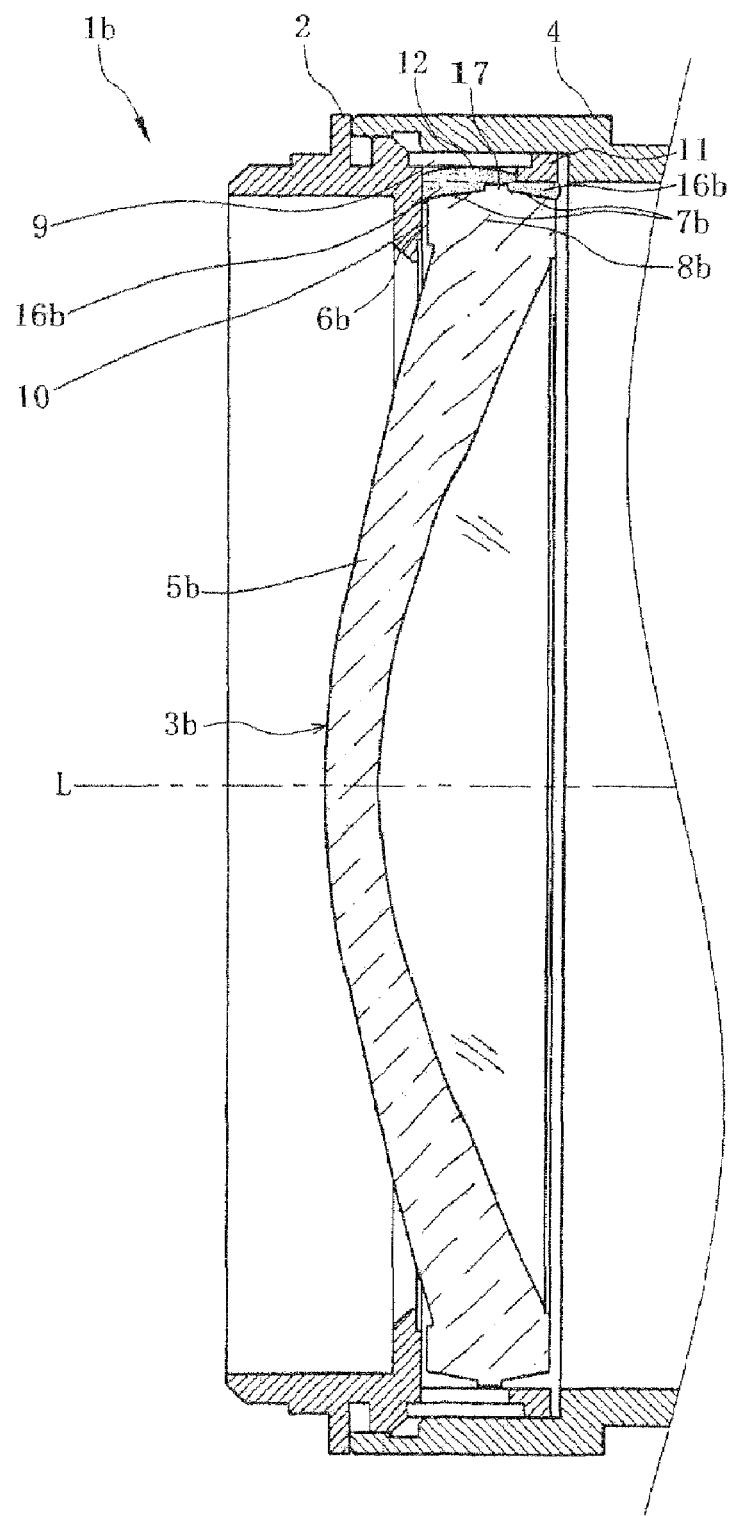
FIG. 4 is a longitudinal sectional view of the lens device according to another embodiment of the present invention.

FIG. 4 shows a lens device 1b according to an alternative embodiment. In this embodiment, a lens holding fixture frame 2 is designed in consideration of adjustment of an axial position and an inclination of an optical axis of the lens element 3b. A front base surface 6b of the lens element 3b does not always tightly fit to an annular positioning flange 10 of the lens holding fixture frame 2 after adjustment of axial position and inclination of the lens element 3b. As a consequence, the lens element 3b is enabled to move in opposite axial directions L if an adhesive 12 exfoliates from the lens element 3b and the lens holding fixture frame 2. According to this embodiment, the lens element 3b comprises a major lens portion 5b and a flange portion 8b having a front base surface 6b and a lateral surface 7b which is tapered toward a strip-shaped circumferential projection 17 from front and rear edges thereof. In a state in which the lens element 3*b* is fitted in the rear frame portion 11 of the lens holding fixture frame 2, the lateral surface 7*b* forms annular clearances tapering forward and backward from the rear and front edges thereof between the flange portion 8*b* and the rear frame portion 11. When filling an adhesive 12 partly in the annular clearances through holes 9, it forms wedge-shaped retaining means 16*b* at opposite sides of the strip-shaped circumferential projection 17 when it cures. The wedge-shaped retaining means 16*b* fixedly hold the flange portion 8*b* of the lens element 3*b* in position in opposite axial directions L. Accordingly, even if the adhesive 12 exfoliates from the flange portion 8*b*, the wedge-shaped retaining means 16*b* prevent the lens element 3*b* from falling out of the lens holding fixture frame 2, and besides holding the lens element 3*b* in the adjusted position.

Figure 5:
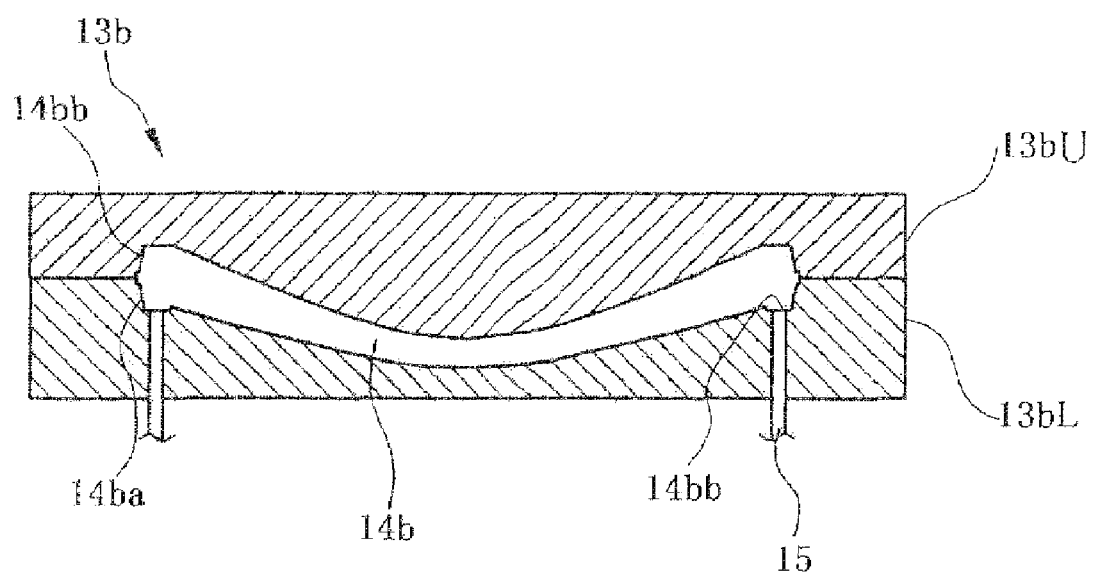
FIG. 5 is a cross sectional view of an injection mold for molding a lens element of the lens device shown in FIG. 4.
Figure 6:
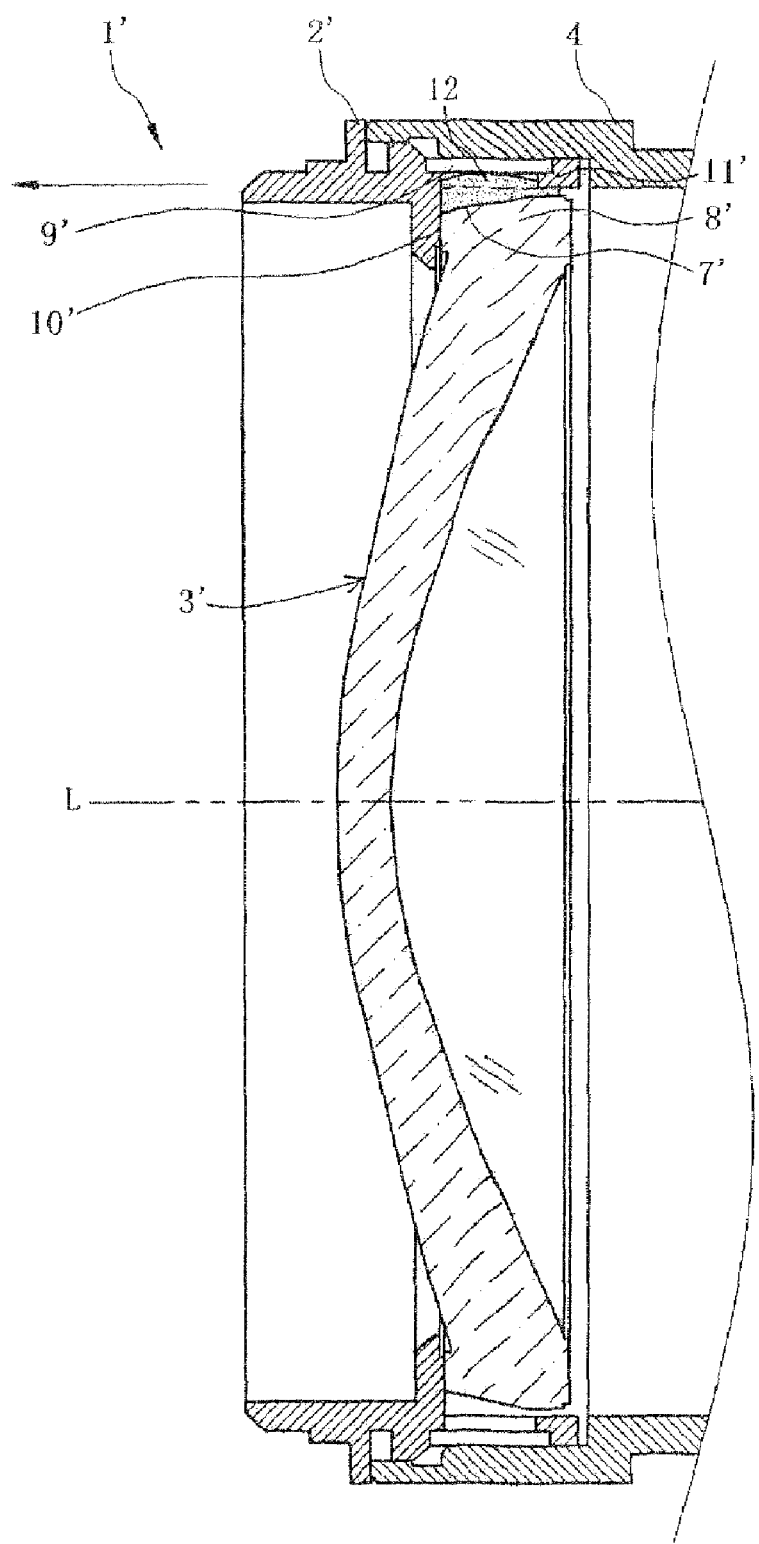
FIG. 6 is a longitudinal sectional view of a prior art lens device.
Figure 7:
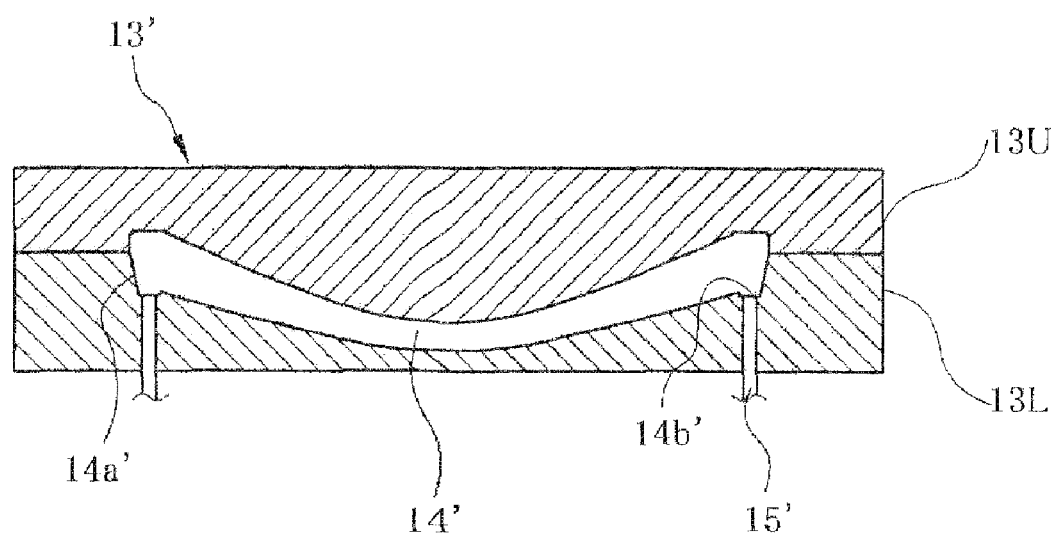
FIG. 7 is a cross sectional view of an injection mold for molding a lens element of the lens device shown in FIG. 6.

Referring to FIG. 5 showing an injection mold 13*b* for injection molding the lens element 3*b*, the injection mold comprises an upper mold half 13*b*U and a lower mild half 13*b*L between which a mold cavity 14*b* is formed. The lower mold half 13*b*L has a flank 14*ba* forming a peripheral wall of the mold cavity 14*b* which has a draft angle equal to an angle at which the lateral surface 7*b* of the flange portion 8*b* tapers from the front edge of the flange portion 8*b* and a shoulder 14*bb* for forming a front base surface 6*b* of the flange portion 8*b* of the lens element 3*b* and is provided with a plurality of ejection pins 15 arranged correspondingly to an annular shoulder 14*bb*. On the other hand, the upper mold half 13*b*U has a flank 14*bb* forming a peripheral wall of the mold cavity 14*b* which has a draft angle equal to an angle at which the lateral surface 7*b* of the flange portion 8*b* tapers from the rear edge of the flange portion 8*b*. The ejection pins 15 may be provided in the upper mold half 13*b*U in place of the lower mold half 13*b*L.

Although the present invention has been described about the lens device having a plastic lens element, much the same is true on a lens device having a glass lens element It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A lens device comprising:
   a lens element having a major lens portion and an annular flange portion formed as an integral piece, said annular flange portion having a lateral surface tapering forward from a rear edge of said annular flange portion;
   a lens holder for holding said lens element therein which comprises a cylindrical frame for receiving said lens element therein and an annular flange formed as an integral part of said cylindrical frame for positioning said lens element received in said cylindrical frame in an axial direction; and
   fixing means for fixing said lens element to said lens holder which comprises a tapered annular clearance formed between said lateral surface of said annular flange portion of said lens element received in said cylindrical frame and said cylindrical frame and an adhesive partly filled in said tapered annular clearance;
   wherein said adhesive cures in a wedge-shape in said tapered annular clearance so as thereby to thrusts said lens element toward said annular flange in said axial direction.

2. The lens device as defined in claim 1, wherein said lens holder has a plurality of access holes formed at circumferential regular intervals in said cylindrical frame through which said adhesive is filled into said tapered annular clearance.

3. The lens device as defined in claim 1, wherein said lens element is made of a synthetic resin and produced in injection molding by the use of a mold having a mold cavity defined by a flank having a draft angle which forms said lateral surface tapering forward from said rear edge.

4. A lens device comprising:
   a lens element having a major lens portion and an annular flange portion formed as an integral piece, said annular flange portion having a lateral surface tapering from front and rear edges of said annular flange portion;
   a lens holder for holding said lens element therein which comprises a cylindrical frame for receiving said lens element therein and an annular flange formed as an integral part of said cylindrical frame for positioning said lens element received in said cylindrical frame in an axial direction; and
   fixing means for fixing said lens element to said lens holder which comprises tapered annular clearances formed between said lateral surface of said annular flange portion of said lens element received in said cylindrical frame and said cylindrical frame and extending from said front and rear edges of said annular flange portion, and an adhesive partly filled in said tapered annular clearances;
   wherein said adhesive cures in a wedge-shape in said tapered annular clearances so as thereby to thrusts said lens element in opposite axial directions.

5. The lens device as defined in claim 4, wherein said lens holder has a plurality of access holes formed at circumferential regular intervals in said cylindrical frame through which said adhesive is filled into said tapered annular clearances.

6. The lens device as defined in claim 4, wherein said lens element is made of a synthetic resin and produced in injection molding by the use of a mold comprising upper and lower mold halves, each said mold half having a flank which defines a mold cavity of said mold and has a draft angle which forms said lateral surface tapering from either one said front and rear edges.

* * * * *